(12) United States Patent
Fujii et al.

(10) Patent No.: US 9,074,688 B2
(45) Date of Patent: Jul. 7, 2015

(54) ROTARY SHAFT SEAL

(75) Inventors: Nobukazu Fujii, Wakayama (JP); Hironori Oida, Wakayama (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 13/637,643

(22) PCT Filed: Dec. 24, 2010

(86) PCT No.: PCT/JP2010/007504
§ 371 (c)(1),
(2), (4) Date: Sep. 26, 2012

(87) PCT Pub. No.: WO2011/117951
PCT Pub. Date: Sep. 29, 2011

(65) Prior Publication Data
US 2013/0015624 A1   Jan. 17, 2013

(30) Foreign Application Priority Data
Mar. 26, 2010   (JP) ................................. 2010-071511

(51) Int. Cl.
*F16J 15/32* (2006.01)
(52) U.S. Cl.
CPC .......... *F16J 15/3228* (2013.01); *F16J 15/3232* (2013.01); *F16J 15/324* (2013.01)
(58) Field of Classification Search
USPC .......................... 277/561, 560, 562, 353, 515
See application file for complete search history.

(56) References Cited

U.S. PATENT DOCUMENTS

| | | | |
|---|---|---|---|
| 4,159,828 A | | 7/1979 | Ostling et al. |
| 4,664,392 A | * | 5/1987 | Hatch ............................ 277/551 |
| 4,672,733 A | * | 6/1987 | Schmitt ........................... 29/511 |
| 4,709,930 A | * | 12/1987 | Forch ............................ 277/430 |
| 5,009,435 A | | 4/1991 | Villanyi et al. |
| 5,083,802 A | * | 1/1992 | Shimasaki et al. ............ 277/560 |

(Continued)

FOREIGN PATENT DOCUMENTS

| | | | |
|---|---|---|---|
| DE | 3420523 A1 | * 12/1985 | ............... F16J 15/32 |
| DE | 19501724 C1 | 10/1996 | |

(Continued)

OTHER PUBLICATIONS

Extended European Search Report in corresponding European Application No. 10848344.7 dated Dec. 10, 2012.

*Primary Examiner* — Kristina Fulton
*Assistant Examiner* — L. Susmitha Koneru
(74) *Attorney, Agent, or Firm* — Knobbe Martens Olson & Bear LLP (57) ABSTRACT

In a rotary shaft seal configured such that first and second seal elements (1) and (2) each having a fundamental thickness (T) and each curved through a curved wall portions (5) of a corresponding one of the first and second seal elements (1) and (2) to have a generally J-shaped cross section are arranged so as to be curved in opposite directions along a shaft center (L), a wide circumferential groove (7) is formed in each of opposed surfaces (6) of the respective curved wall portions (5) of the first and second seal elements (1) and (2). Under use conditions (where the seal is inserted), extreme end portions (8) of the first and second seal elements (1) and (2) are in contact with an outer circumferential surface (9*a*) of a rotary shaft (9) with a peak contact pressure such that a contact width (E) is equal to or less than twice the fundamental thickness (T).

16 Claims, 7 Drawing Sheets

(56) References Cited

U.S. PATENT DOCUMENTS

| | | | |
|---|---|---|---|
| 5,209,502 A | 5/1993 | Savoia | |
| 5,615,894 A | 4/1997 | vom Schemm | |
| 6,170,833 B1* | 1/2001 | Cox et al. | 277/551 |
| 6,257,587 B1* | 7/2001 | Toth et al. | 277/309 |
| 6,406,034 B1* | 6/2002 | Alcantara et al. | 277/634 |
| 6,880,830 B2 | 4/2005 | Olsson et al. | |
| 7,134,670 B2* | 11/2006 | Morimoto et al. | 277/551 |
| 7,467,797 B2* | 12/2008 | Oiyama et al. | 277/553 |
| 7,467,798 B2* | 12/2008 | Morimoto et al. | 277/560 |
| 7,780,172 B2* | 8/2010 | Ashida et al. | 277/560 |
| RE42,061 E | 1/2011 | Olsson et al. | |
| 8,052,153 B2* | 11/2011 | Ebihara et al. | 277/572 |
| 8,343,370 B2* | 1/2013 | Dewald et al. | 216/57 |
| 2003/0062689 A1 | 4/2003 | Olsson et al. | |
| 2003/0168817 A1 | 9/2003 | Iwakata et al. | |
| 2005/0167928 A1* | 8/2005 | Park et al. | 277/560 |

FOREIGN PATENT DOCUMENTS

| | | |
|---|---|---|
| EP | 2108450 A1 | 10/2009 |
| JP | 53-79150 A | 7/1978 |
| JP | 63-02587 U | 2/1988 |
| JP | 63-025876 U | 2/1988 |
| JP | 1-085572 U | 6/1989 |
| JP | 4-117959 U | 10/1992 |
| JP | 7-317912 A | 12/1995 |
| JP | 10-184931 A | 7/1998 |
| JP | 2002-115762 A | 4/2002 |
| JP | 2003-083455 A | 3/2003 |
| JP | 2003-262275 A | 9/2003 |

\* cited by examiner

ROTARY SHAFT SEAL

CROSS-REFERENCE TO RELATED APPLICATION

This application is the U.S. National Phase under 35. U.S.C. §371 of International Application PCT/JP2010/007504, filed Dec. 24, 2010, which claims priority to Japanese Patent Application No. 2010-071511, filed Mar. 26, 2010. The disclosures of the above-described applications are hereby incorporated by reference in their entirety. The International Application was published under PCT Article 21(2) in a language other than English.

TECHNICAL FIELD

The present invention relates to rotary shaft seals.

BACKGROUND ART

Conventionally, as a rotary shaft seal for use in, e.g., compressors, a rotary shaft seal has been known in which first and second seal elements having an equal thickness are arranged so as to be curved in opposite directions along the shaft center to have a generally T-shaped cross section (see, e.g., PATENT DOCUMENT 1).

However, in recent years, with improvement in efficiency and upsizing of manufacturing apparatuses, pumps with high discharge capability have been required, and a rotary shaft seal used for such a pump also has needed to be used in a severe use environment requiring, e.g., high rotation speeds and low leakage. A conventional rotary shaft seal has a problem in which the radial load of the rotary shaft seal (force for compressing a shaft) is so high that the friction (sliding torque) is increased, and further has a problem in which a large amount of grease contained in a space between the first and second seal elements is lost, and thus, the depth of wear on each of the first and second seal elements is deep.

CITATION LIST

Patent Document

PATENT DOCUMENT 1: Japanese Patent Publication No. H07-317912

SUMMARY OF THE INVENTION

Problems to be solved by the present invention are that since, in order to meet severe demands for, e.g., high rotation speeds and low leakage, the radial load of the rotary shaft seal (force for compressing a shaft) is too high, the depth of wear on each of seal elements is deep, and the amount of grease lost is large, and that it is difficult to maintain stable sealing performance over the long term while meeting the demands as described above.

To address the above problems, a rotary shaft seal according to the present invention is configured such that first and second seal elements each having a curved wall portion are arranged so as to be curved in opposite directions along a shaft center, and a wide single circumferential groove is formed in each of opposed surfaces of the respective curved wall portions of the first and second seal elements.

In a rotary shaft seal configured such that first and second seal elements each curved through a curved wall portion of a corresponding one of the first and second seal elements to have a generally J-shaped cross section are arranged so as to be curved in opposite directions along a shaft center, a wide single circumferential groove is formed in each of opposed surfaces of the respective curved wall portions of the first and second seal elements.

The first and second seal elements may each have a fundamental thickness, the wide single circumferential groove may be formed in each of the opposed surfaces of the respective curved wall portions of the first and second seal elements, and under use conditions, extreme end portions of the first and second seal elements may be in contact with an outer circumferential surface of a rotary shaft with a peak contact pressure such that a contact width is equal to or less than twice the fundamental thickness.

The first and second seal elements may each have a fundamental thickness, the wide single circumferential groove may be formed in each of the opposed surfaces of the respective curved wall portions of the first and second seal elements, and under initial use conditions, a diameter of each of holes of the first and second seal elements may be set large enough to bring extreme end portions of the first and second seal elements in line contact with an outer circumferential surface of a rotary shaft.

Under use conditions, grease may be contained in an intermediate space surrounded by the first and second seal elements and an outer circumferential surface of a rotary shaft.

The rotary shaft seal may include: outer and inner cases between which the first and second seal elements are sandwiched, and radial locations of inner circumferential end portions of inner collar portions of the outer and inner cases may be brought into correspondence with thin portions of the first and second seal elements in each of which the single circumferential groove exists.

The rotary shaft seal may include: a pair of inner cases between which the first and second seal elements are sandwiched, and radial locations of inner circumferential end portions of inner collar portions of the inner cases may be brought into correspondence with thin portions of the first and second seal elements in each of which the single circumferential groove exists.

The rotary shaft seal of the present invention can reduce the radial loads (for compressing the shaft) from the first and second seal elements, and can reduce the friction (sliding torque). Furthermore, stable sealing performance can be maintained over the long term even in a severe use environment requiring, e.g., high rotation speeds and low leakage, and high durability can be provided. Furthermore, the amount of grease contained between the seal elements can be increased, and the amount of the grease lost can be reduced; therefore, the depth of wear on each of the first and second seal elements can be further reduced, resulting in an increase in life.

DESCRIPTION OF EMBODIMENTS

Figure 1:
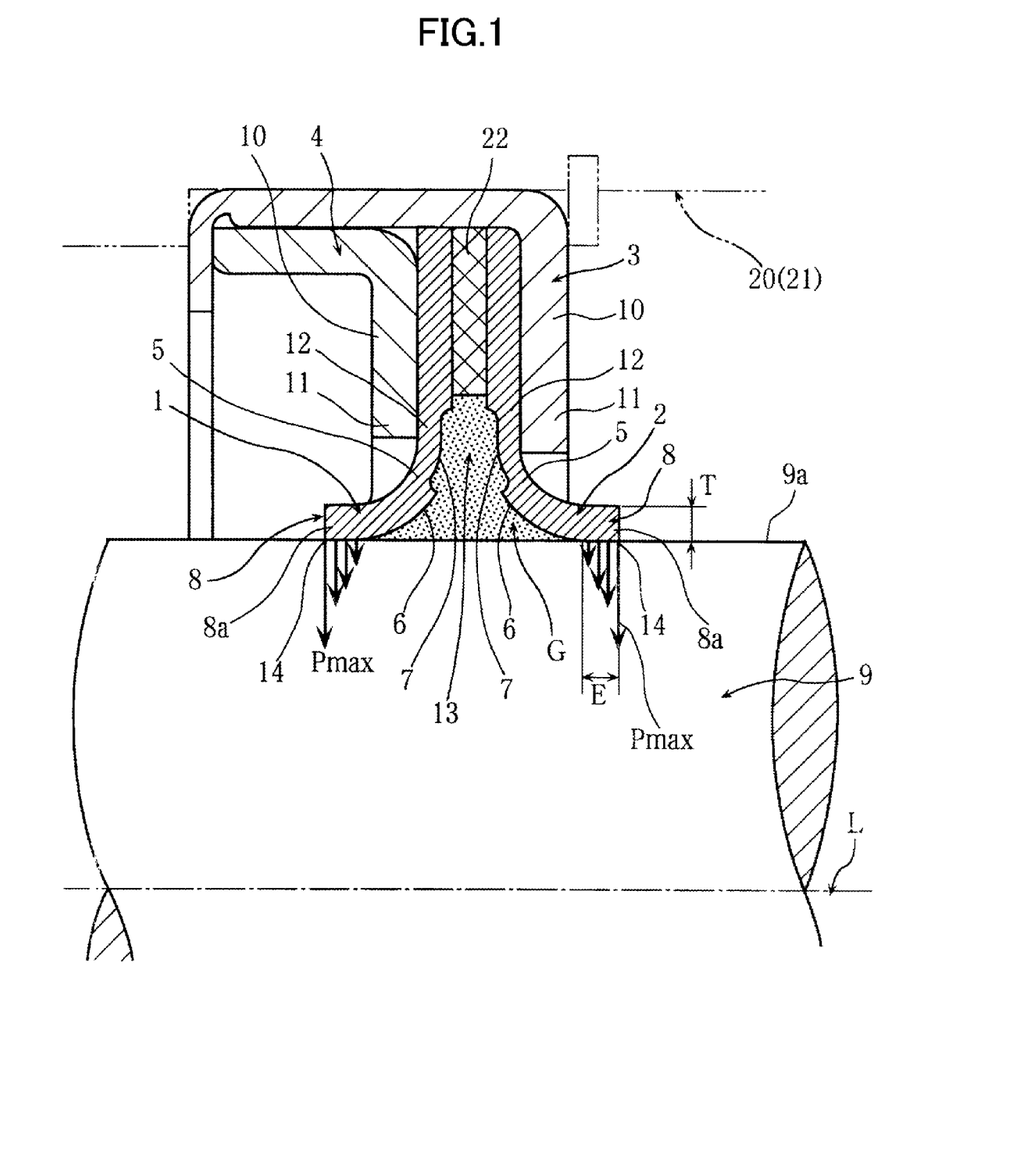
FIG. 1 is a cross-sectional front view illustrating a principal portion of a rotary shaft seal under use conditions according to a first embodiment of the present invention.
Figure 2:
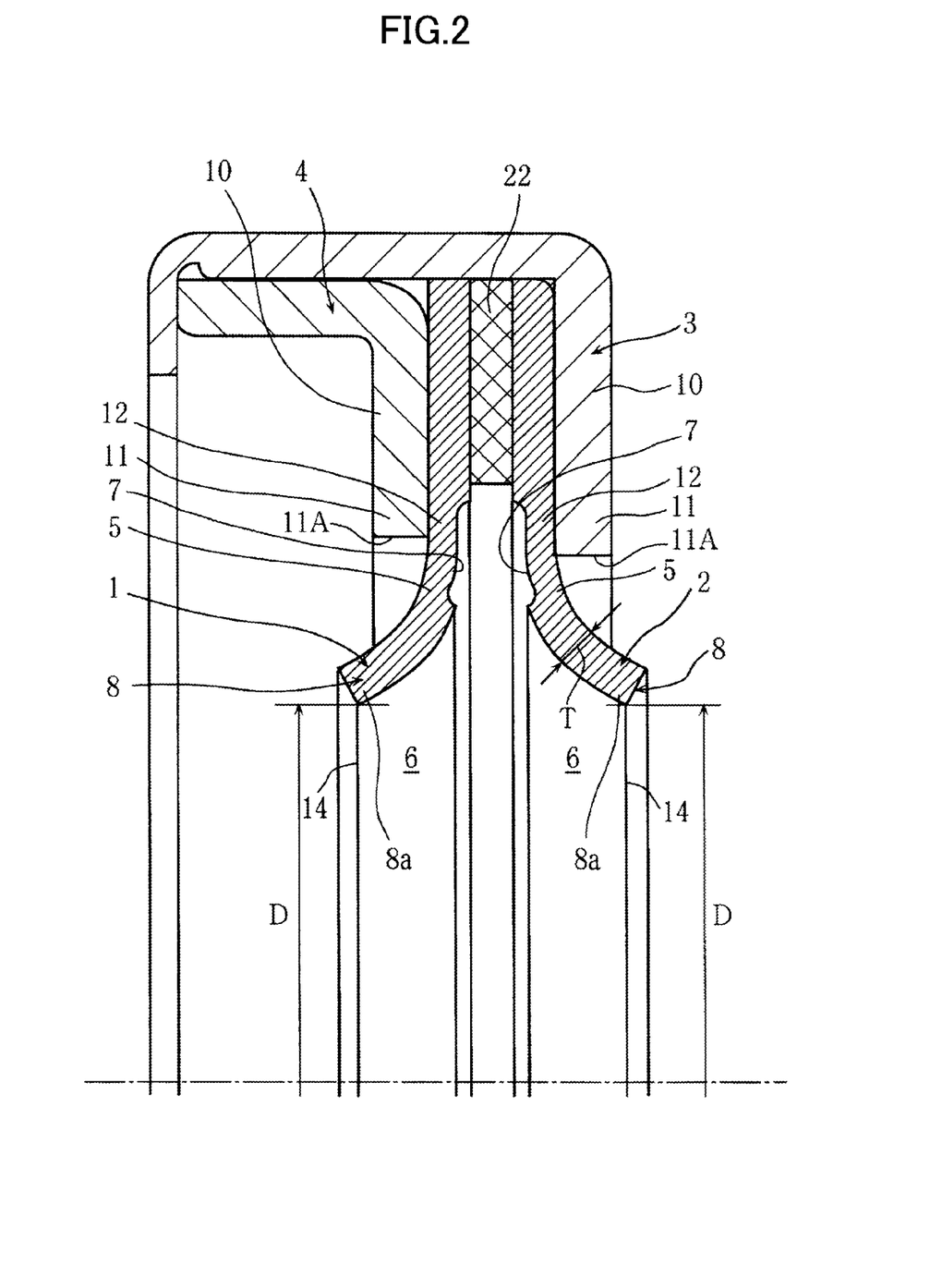
FIG. 2 is a cross-sectional front view illustrating a principal portion of the rotary shaft seal.
Figure 3:
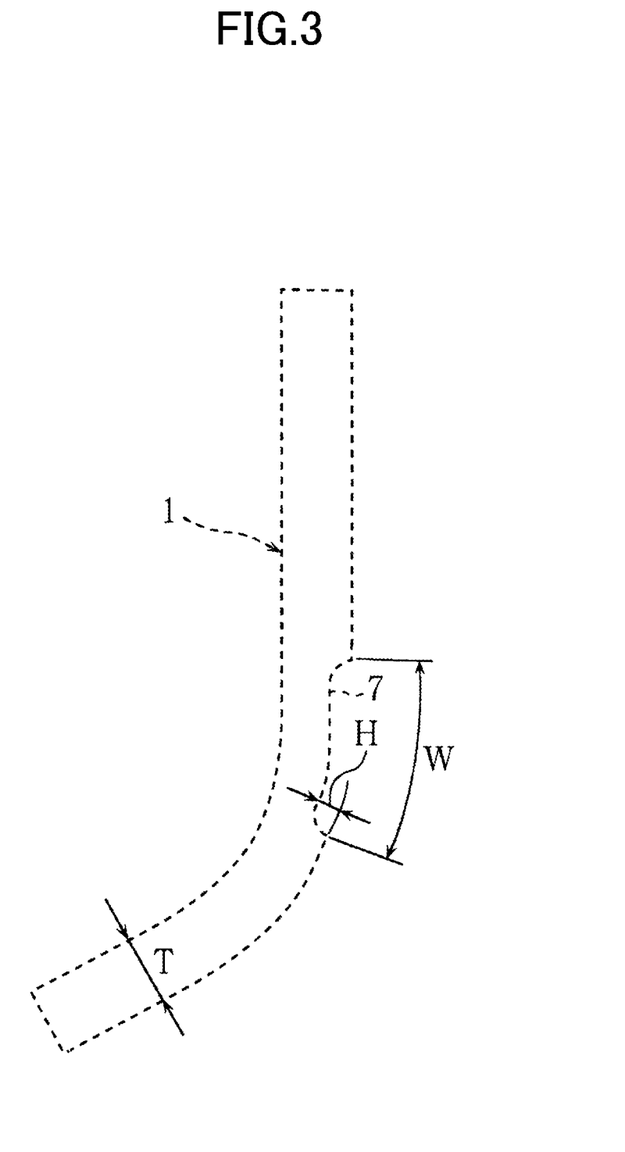
FIG. 3 is a block diagram.

FIGS. 1-3 illustrate a first embodiment of the present invention. A rotary shaft seal of the first embodiment is a rotary shaft seal for, e.g., a pump or a compressor, and is used in, e.g., a sealed region to which hydraulic oil is hardly closer. Outer and inner cases 3 and 4 between which first and second seal elements 1 and 2 are sandwiched are provided. The first and second seal elements 1 and 2 are made of, e.g., PTFE. The outer and inner cases 3 and 4 are made of, e.g., metal, such as a steel sheet, or synthetic resin, and the outer case 3 is fitted into a hole 21 of a housing 20.

The first and second seal elements 1 and 2 each having a fundamental thickness T and curved through corresponding curved wall portions 5 to have a generally J-shaped cross section are arranged in an inverted V shape so as to be curved in opposite directions along the shaft center L. A wide single circumferential groove 7 (cutout) is formed in each of opposed surfaces 6 of the respective curved wall portions 5 of the first and second seal elements 1 and 2.

The thicknesses of the seal elements 1 and 2 are not limited to an equal thickness as illustrated by the dotted line in FIG. 3, and may be nonuniform (not shown). The fundamental thickness T herein denotes the average thickness of a region (range) of each of the seal elements 1 and 2 in contact with a rotary shaft 9.

Under use conditions (i.e., under the conditions where the inserted rotary shaft seal is being used), corner portions 8a of extreme end portions 8 of the first and second seal elements 1 and 2 are in contact with an outer circumferential surface 9a of the rotary shaft 9 with a peak contact pressure Pmax, and the contact width E of a region of each of the extreme end portions 8 in contact with the outer circumferential surface 9a is equal to or less than twice the fundamental thickness T. Specifically, under the use conditions, the fundamental thickness T and the contact width E are set to satisfy the expression E≤2·T. When the contact width E is greater than twice the fundamental thickness T, peak contact pressures are applied to not only the extreme end portions 8 but also portions of the seal elements except for the extreme end portions 8 (portions thereof closer to a later-described intermediate space 13 than the extreme end portions 8) under the use conditions, and the seal elements are worn away so as to be recessed, thereby causing leakage.

The radial locations of inner circumferential end portions 11 of inner collar portions 10 of the outer and inner cases 3 and 4 correspond to thin portions 12 of the first and second seal elements 1 and 2 in each of which the single circumferential groove 7 exists. Fixed flat portions of the first and second seal elements 1 and 2 are held while being compressed between the inner collar portions 10, 10 with a flat ring-shaped gasket 22 interposed between the fixed flat portions. The inner collar portions 10, 10 hold the first and second seal elements 1 and 2 from the surfaces of the first and second seal elements 1 and 2 opposite to the (later-described) intermediate space 13, and thus, the first and second seal elements 1 and 2 each keep having a generally J-shaped cross section. Under the use conditions, grease G is contained in the intermediate space 13 surrounded by the first and second seal elements 1 and 2 and the outer circumferential surface 9a of the rotary shaft 9.

As illustrated in FIG. 3, the relationship between the depth H of the single circumferential groove 7 and the fundamental thickness T is represented by the expression $0.15 \times T \leq H \leq 0.50 \times T$, and is preferably set to satisfy the expression $0.20 \times T \leq H \leq 0.40 \times T$. When the depth H is in this range, this allows the magnitude of each of the radial loads applied from the first and second seal elements 1 and 2 to the rotary shaft 9 under the use conditions to be appropriate. Specifically, when the depth H is shallower than its lower limit, high radial loads are applied to the rotary shaft 9 under the use conditions. When the depth H exceeds its upper limit, the radial loads are excessively low under the use conditions, thereby preventing appropriate sealing.

The relationship between the width W of the circumferential groove 7 and the fundamental thickness T is represented by the expression $1.0 \times T \leq W \leq 5.0 \times T$. When the width W is in this range, this allows the magnitude of each of the radial loads applied from the first and second seal elements 1 and 2 to the rotary shaft 9 under the use conditions to be appropriate. Specifically, when the contact width W is less than 1.0 times the fundamental thickness T, high radial loads are applied to the rotary shaft 9 under the use conditions. When the contact width W is greater than 5.0 times the fundamental thickness T, the radial loads are excessively low under the use conditions, thereby preventing appropriate sealing.

Figure 4:
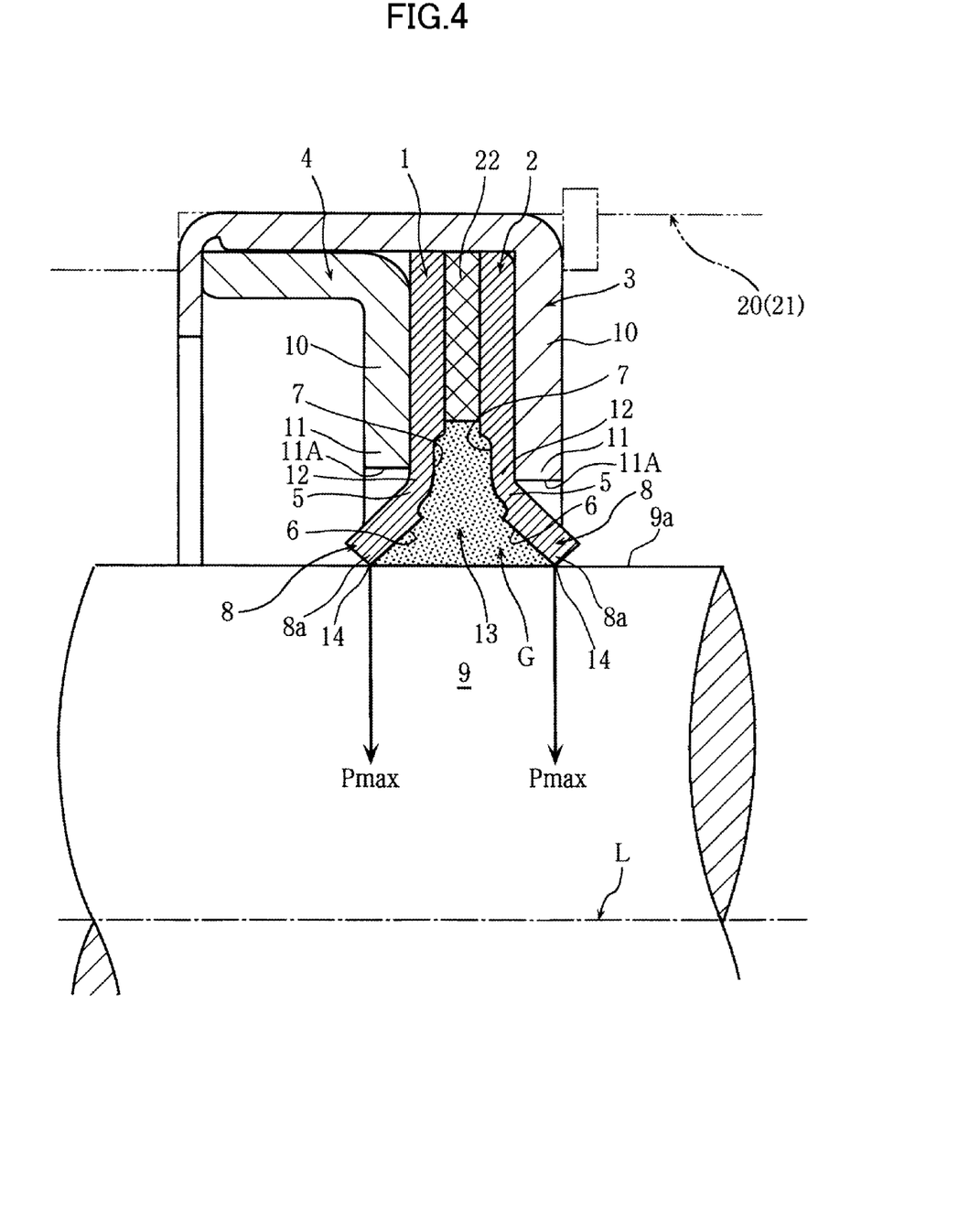
FIG. 4 is a cross-sectional front view illustrating a principal portion of a rotary shaft seal under use conditions according to a second embodiment.

FIG. 4 illustrates a second embodiment. Under the initial use conditions (i.e., immediately after insertion of the rotary shaft seal and under the conditions where wear does not occur), the diameter D (see FIG. 2) of each of holes 14 of first and second seal elements 1 and 2 is set large enough to bring corner portions 8a of extreme end portions 8 in line contact with an outer circumferential surface 9a of a rotary shaft 9. The other structures are similar to those in the first embodiment.

While the seal elements 1 and 2 each having a generally J-shaped cross section were described with reference to FIGS. 1-6, the seal elements 1 and 2 can each have a generally L-shaped cross section (not shown) if necessary.

Figure 5:
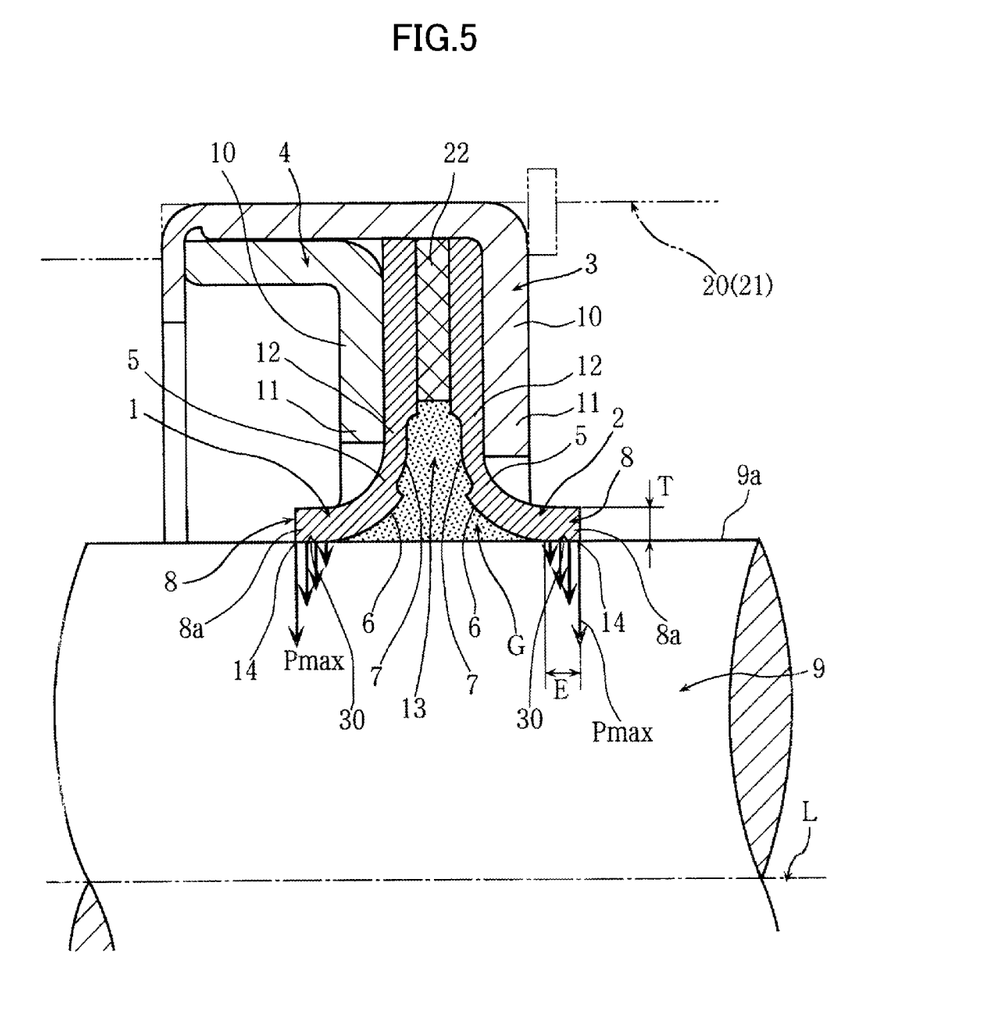
FIG. 5 is a cross-sectional front view illustrating a principal portion of a rotary shaft seal under use conditions according to a third embodiment.
Figure 6:
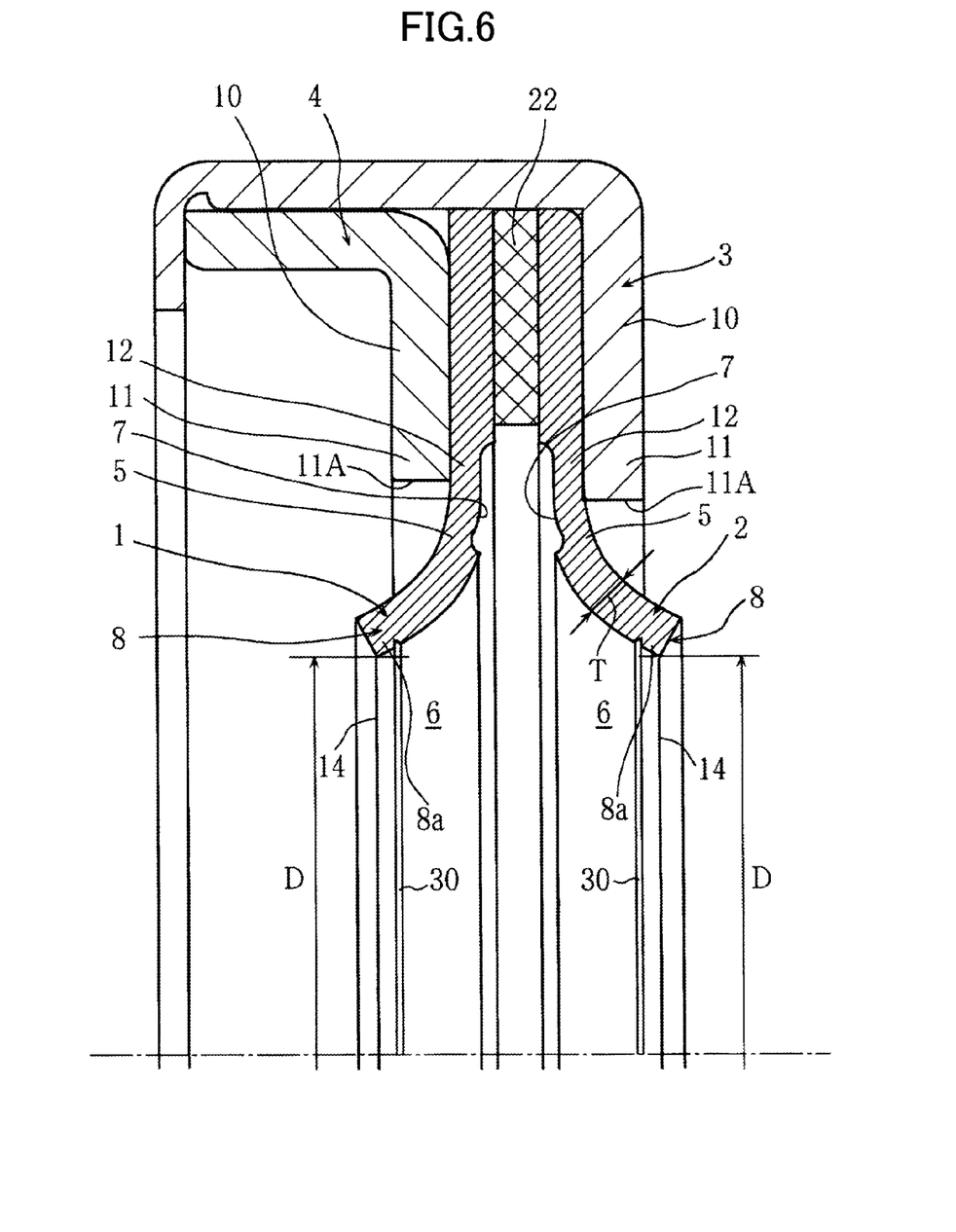
FIG. 6 is a cross-sectional front view illustrating a principal portion of a rotary shaft seal.

Next, in a third embodiment illustrated in FIGS. 5 and 6, first and second seal elements 1 and 2 each further include a single independent concentric groove 30 (or a plurality of independent concentric grooves 30). Specifically, the single independent concentric groove 30 (or unshown two or more independent concentric grooves 30) is formed within the contact width E of a portion of each of the first and second seal elements 1 and 2 in sliding contact with a rotary shaft 9. The formation of the concentric groove 30 as described above effectively prevents leakage of grease G to the outside, and furthermore, the grease G enters the concentric groove 30, and is retained therein, thereby preventing the portion of the seal element in sliding contact with the rotary shaft 9 from being worn away in an early stage. FIGS. 5 and 6 correspond to previously described FIGS. 1 and 2, respectively, the same reference characters are used to represent equivalent structures and operations, and thus, the description thereof is omitted.

Next, as illustrated in, e.g., FIGS. 2, 4, and 6, the radial location of an inner circumferential end surface 11A of an inner collar portion 10 of an inner case 4 is in the radial range of a circumferential groove 7 of a first seal element 1, and the radial location of an inner circumferential end surface 11A of an inner collar portion 10 of an outer case 3 is in the radial range of a single circumferential groove 7 of a second seal element 2. With such a configuration, the locations at which the first and second seal elements 1 and 2 start being curved (as curved wall portions 5 of the seal elements) are precisely determined.

Figure 7:
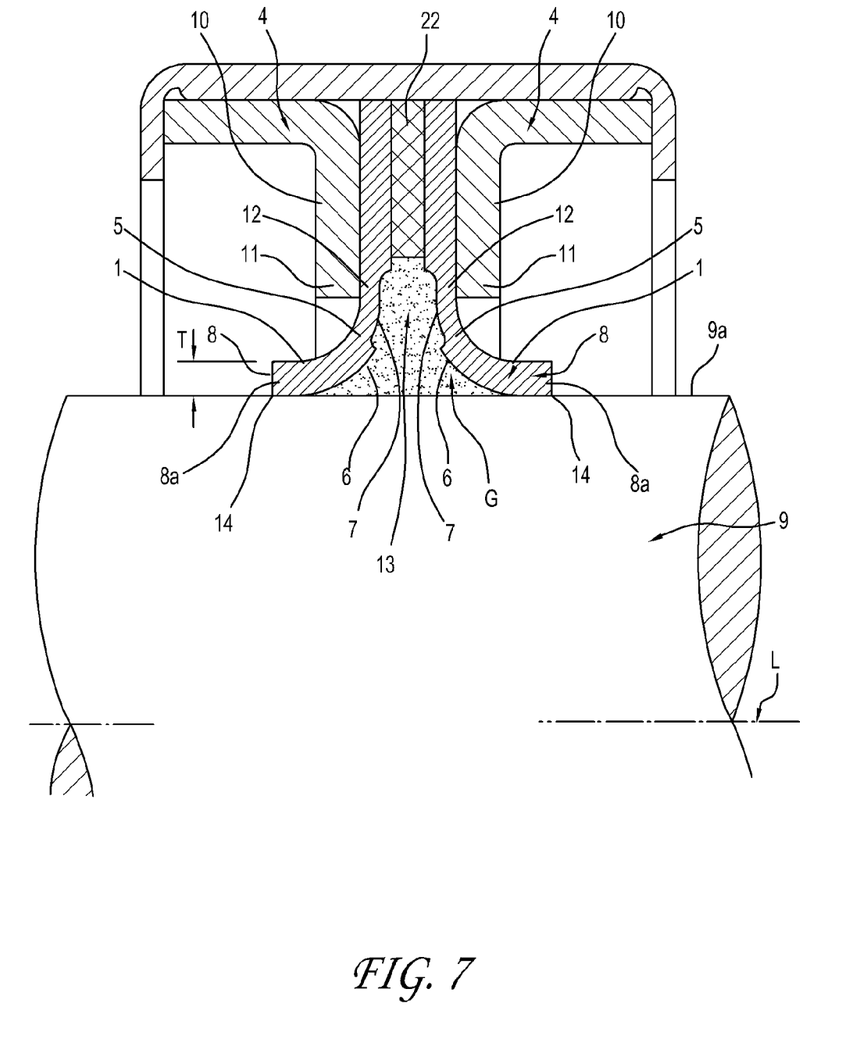
FIG. 7 is cross-sectional view illustrating a principal portion of a rotary shaft seal under use condition when first and second seal elements are sandwiched between a pair of inner cases.

When (although not shown) first and second seal elements 1 and 2 are sandwiched between a pair of inner cases 4, 4, the radial locations of inner circumferential end portions 11 of inner collar portions 10 of the pair of inner cases 4, 4 are brought into correspondence with thin portions 12 of the first and second seal elements 1 and 2 in each of which the single circumferential groove 7 exists.

As described above, according to the present invention, the first and second seal elements 1 and 2 having the corresponding curved wall portions 5 are arranged so as to be curved in opposite directions along the shaft center L, and a wide single circumferential groove 7 is formed in each of opposed surfaces 6 of the respective curved wall portions 5 of the first and second seal elements 1 and 2, thereby reducing the radial loads from the first and second seal elements 1 and 2 (the sum of all of forces for compressing the shaft), and reducing the friction (sliding torque). Furthermore, durability can be improved. Specifically, stable sealing performance can be maintained over the long term while meeting severe demands for, e.g., high rotation speeds and low leakage. Furthermore, the amount of grease contained between the seal elements can be increased. Moreover, wear conditions of the seal elements are allowable. The depth of wear on each of the first and second seal elements 1 and 2 is shallow, and the amount of the grease G lost is small.

In a rotary shaft seal configured such that the first and second seal elements 1 and 2 each having the fundamental thickness T and curved through the corresponding curved wall portions 5 to have a generally J-shaped cross section are arranged so as to be curved in opposite directions along the shaft center L, a wide circumferential groove 7 is formed in each of the opposed surfaces 6 of the respective curved wall portions 5 of the first and second seal elements 1 and 2, thereby reducing the radial loads from the first and second seal elements 1 and 2 (the sum of all of forces for compressing the shaft), and reducing the friction (sliding torque). Furthermore, durability can be improved. Specifically, stable sealing performance can be maintained over the long term while meeting severe demands for, e.g., high rotation speeds and low leakage. Furthermore, the amount of grease contained between the seal elements can be increased. Moreover, wear conditions of the seal elements are allowable. The depth of wear on each of the first and second seal elements 1 and 2 is shallow, and the amount of the grease G lost is small.

The first and second seal elements 1 and 2 each have the fundamental thickness T, the wide single circumferential groove 7 is formed in each of the opposed surfaces 6 of the respective curved wall portions 5 of the first and second seal elements 1 and 2, and under the use conditions (where the seal elements are inserted), the extreme end portions 8 are in contact with the outer circumferential surface 9a of the rotary shaft 9 with the peak contact pressure such that the contact width E is equal to or less than twice the fundamental thickness T, thereby reducing the radial loads from the first and second seal elements 1 and 2 (the sum of all of forces for compressing the shaft), and reducing the friction (sliding torque). Furthermore, durability can be improved. Specifically, stable sealing performance can be maintained over the long term even in a severe use environment requiring, e.g., high rotation speeds and low leakage. Furthermore, the amount of grease contained between the seal elements can be increased. Moreover, wear conditions of the seal elements are allowable. The depth of wear on each of the first and second seal elements 1 and 2 is shallow, and the amount of the grease G lost is small.

The first and second seal elements 1 and 2 each have the fundamental thickness T, the wide single circumferential groove 7 is formed in each of the opposed surfaces 6 of the respective curved wall portions 5 of the first and second seal elements 1 and 2, and under the initial use conditions, the diameter D of each of the holes 14 of the first and second seal elements 1 and 2 is set large enough to bring the extreme end portions 8 in line contact with the outer circumferential surface 9a of the rotary shaft 9; therefore, the extreme end portions 8 are in contact with the outer circumferential surface 9a of the rotary shaft 9 with the peak contact pressure. Thus, the radial loads from the first and second seal elements 1 and 2 (the sum of all of forces for compressing the shaft) can be reduced, and the friction (sliding torque) can be reduced. Furthermore, durability can be improved. Specifically, stable sealing performance can be maintained over the long term even in a severe use environment requiring, e.g., high rotation speeds and low leakage. Furthermore, the amount of grease contained between the seal elements can be increased. Moreover, wear conditions of the seal elements are allowable. The depth of wear on each of the first and second seal elements 1 and 2 is shallow, and the amount of the grease G lost is small.

Under the use conditions, the grease G is contained in the intermediate space 13 surrounded by the first and second seal elements 1 and 2 and the outer circumferential surface 9a of the rotary shaft 9, thereby significantly improving durability. In particular, the circumferential grooves 7, 7 increase the volume of the intermediate space 13, and thus, the grease G provides lubrication over the long term.

The outer and inner cases 3 and 4 between which the first and second seal elements 1 and 2 are sandwiched are provided, and the radial locations of the inner circumferential end portions 11 (inner circumferential end surfaces 11A) of the inner collar portions 10 of the outer and inner cases 3 and 4 are brought into correspondence with the thin portions 12 of the first and second seal elements 1 and 2 in each of which the single circumferential groove 7 exists; therefore, the locations at which the first and second seal elements 1 and 2 start being curved are precisely determined, the curved wall portions 5, 5 of the first and second seal elements 1 and 2 are precisely shaped, the seal elements 1 and 2 can be effectively prevented from being abnormally worn away due to significant deformation of both of the seal elements 1 and 2 in opposite directions, and the magnitude of each of the radial loads can be appropriate.

The pair of inner cases 4, 4 between which the first and second seal elements 1 and 2 are sandwiched are provided, and the radial locations of the inner circumferential end portions 11 of the inner collar portions 10 of the inner cases 4, 4 are brought into correspondence with the thin portions 12 of the first and second seal elements 1 and 2 in each of which the single circumferential groove 7 exists; therefore, the curved wall portions 5, 5 of the first and second seal elements 1 and 2 are precisely shaped, the seal elements 1 and 2 can be effectively prevented from being abnormally worn away due to significant deformation of both of the seal elements 1 and 2 in opposite directions, and the magnitude of each of the radial loads can be appropriate.

The pair of inner cases 4, 4 between which the first and second seal elements 1 and 2 are sandwiched are provided, and the radial locations of the inner circumferential end portions 11 of the inner collar portions 10 of the inner cases 4, 4 are brought into correspondence with the thin portions 12 of the first and second seal elements 1 and 2 in each of which the circumferential groove 7 exists; therefore, the curved wall portions 5, 5 of the first and second seal elements 1 and 2 are precisely shaped, the seal elements 1 and 2 can be effectively prevented from being abnormally worn away due to significant deformation of both of the seal elements 1 and 2 in opposite directions, and the magnitude of each of the radial loads can be appropriate.

INDUSTRIAL APPLICABILITY

The present invention is useful for rotary shaft seals.

DESCRIPTION OF REFERENCE CHARACTERS

1 First Seal Element
2 Second Seal Element
3 Outer Case
4 Inner Case
5 Curved Wall Portion
6 Opposed Surface
7 Circumferential Groove
8 Extreme End Portion
9 Rotary Shaft
9a Outer Circumferential Surface
10 Inner Collar Portion
11 Inner Circumferential End Portion
12 Thin Portion
13 Intermediate Empty Space
14 Hole
D Diameter
E Contact Width
G Grease
L Shaft Center
T Fundamental Thickness

The invention claimed is:

1. A rotary shaft seal, comprising:
first and second seals each having a fixed flat portion and a curved wall portion arranged so as to be curved in opposite directions along a shaft center, said curved wall portions of said first and second seals forming an intermediate empty space adapted to contain grease;
a single circumferential groove formed in each of the respective curved wall portions of the first and second seals, said single circumferential groove forming thin portions in each of the first and second seals, said thin portions forming at least part of a wall enclosing said intermediate empty space and being thinner than a portion of said seals not enclosing said intermediate empty space, wherein said intermediate empty space is surrounded by the first and second seals and an outer circumferential surface of a rotary shaft under use conditions, and neither the single circumferential groove nor other part of the first and second seals provides a passage through which said intermediate empty space can communicate with a part of the wall not enclosing said intermediate empty space;
a pair of cases between which the first and second seals are sandwiched, each of said cases of said pair of cases having an inner collar portion with an inner circumferential end portion at an end thereof closest to the shaft center, wherein each of said circumferential end portions is aligned with a part of the thin portions of the first and second seals in a direction parallel to said shaft center; and
a flat ring-shaped gasket interposed between said fixed flat portions of said first and second seals.

2. The rotary shaft seal according to claim 1, wherein the first and second seals have a generally J-shaped cross section.

3. The rotary shaft seal of claim 1, wherein
the first and second seals each have a fundamental thickness, the single circumferential groove is formed in each of the opposed surfaces of the respective curved wall portions of the first and second seals and under use conditions, extreme end portions of the first and second seals are in contact with an outer circumferential surface of a rotary shaft with a peak contact pressure such that a contact width is equal to or less than twice the fundamental thickness.

4. The rotary shaft seal of claim 1, wherein
the first and second seals each have a fundamental thickness, the single circumferential groove is formed in each of the opposed surfaces of the respective curved wall portions of the first and second seals, and under initial use conditions, a diameter of each of holes of the first and second seals is set large enough to bring extreme end portions of the first and second seals in line contact with an outer circumferential surface of a rotary shaft.

5. The rotary shaft seal of claim 1, wherein under use conditions, grease is contained in the intermediate empty space surrounded by the first and second seals and an outer circumferential surface of the rotary shaft.

6. The rotary shaft seal of claim 1 wherein the pair of cases comprise a pair of inner cases, said rotary shaft seal further comprising an outer case outside of at least one of said inner cases.

7. The rotary shaft seal of claim 1, wherein the single circumferential groove is formed in each of opposed surfaces of the respective curved wall portions.

8. The rotary shaft seal according to claim 1, wherein the first and second seals each further include a single or a plurality of grooves formed within a portion of each of the first and second seals in sliding contact with a rotary shaft, said single or a plurality of grooves does not communicate with a portion of each of the first and second seals in non-sliding contact with the rotary shaft.

9. The rotary shaft seal according to claim 8, wherein the single or the plurality of grooves are a single or a plurality of concentric grooves.

10. The rotary shaft seal according to claim 1, wherein
each seal has a funnel-like shape in vicinity of an opening to accommodate the rotary shaft and the single circumferential groove thereon,
wherein the seals are arranged such that each funnel-like shape is extended in opposite direction to each other, along the shaft center, and each of the single circumferential grooves are facing each other.

11. The rotary shaft seal according to claim 10, wherein each opening is substantially smaller than the diameter of the rotary shaft so that an inner wall of each seal element in vicinity of the opening is in contact with an outer circumferential surface of the rotary shaft so as to form a contact region.

12. The rotary shaft seal according to claim 11, wherein a width of the contact region is equal to or less than twice of an average thickness of the contact region.

13. The rotary shaft seal according to claim 10, wherein each opening is slightly smaller than the diameter of the rotary shaft so that an edge of each opening is in line contact with an outer circumferential surface of the rotary shaft.

14. The rotary shaft seal according to claim 10, further comprising grease contained in a space surrounded by the pair of seals and an outer circumferential surface of the rotary shaft.

15. The rotary shaft seal according to claim 10, wherein each seal element further includes a single or a plurality of grooves formed within a portion of each element in sliding contact with a rotary shaft.

16. The rotary shaft seal according to claim 15, wherein the single or the plurality of grooves are a single or a plurality of concentric grooves.

* * * * *